United States Patent
Doi et al.

(10) Patent No.: US 7,018,459 B2
(45) Date of Patent: Mar. 28, 2006

(54) INK SET FOR INK-JET RECORDING, INK-JET RECORDING METHOD AND INK-JET RECORDING APPARATUS

(75) Inventors: Takatsugu Doi, Ebina (JP); Yoshiro Yamashita, Ebina (JP); Kyoko Horii, Hadano (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/855,399

(22) Filed: May 28, 2004

(65) Prior Publication Data

US 2005/0012796 A1    Jan. 20, 2005

(30) Foreign Application Priority Data

May 29, 2003  (JP) .............................. 2003-152122

(51) Int. Cl.
*C09D 11/02* (2006.01)
*G01D 11/00* (2006.01)

(52) U.S. Cl. ...................................... 106/31.6; 347/100

(58) Field of Classification Search ............... 106/31.6; 347/100

See application file for complete search history.

(56) References Cited

U.S. PATENT DOCUMENTS

| | | | | |
|---|---|---|---|---|
| 6,059,868 A | * | 5/2000 | Kasperchik | 106/31.27 |
| 6,425,662 B1 | * | 7/2002 | Teraoka et al. | 347/100 |
| 6,730,149 B1 | * | 5/2004 | Arita et al. | 106/31.27 |
| 2004/0179066 A1 | * | 9/2004 | Arita et al. | 347/54 |

FOREIGN PATENT DOCUMENTS

| | | |
|---|---|---|
| JP | A 05-202328 | 8/1993 |
| JP | B2 2667401 | 6/1997 |
| JP | A 2001-294788 | 10/2001 |

\* cited by examiner

*Primary Examiner*—J. A. Lorengo
*Assistant Examiner*—Veronica F. Faison
(74) *Attorney, Agent, or Firm*—Oliff & Berridge, PLC (57) ABSTRACT

The present invention is an ink set for ink-jet recording using at least two kinds of inks comprising a first ink containing at least a pigment, a water-soluble solvent and water, and a second ink containing at least a pigment, a coagulant, a water-soluble solvent and water and having the absolute value of $\zeta$-potential of not less than 10 mV. The present invention also provides an ink-jet recording method using the ink set for ink-jet recording, wherein an image is formed by applying the first ink and second ink on a recording medium so as to contact to each other. The present invention further provides an ink-jet recording apparatus comprising a recording head for ejecting at least the first ink and second ink.

21 Claims, 2 Drawing Sheets

FIG.2

INK SET FOR INK-JET RECORDING, INK-JET RECORDING METHOD AND INK-JET RECORDING APPARATUS

CROSS-REFERENCE TO RELATED APPLICATIONS

This application claims priority under 35 USC 119 from Japanese patent document, No. 2003-152122, the disclosure of which is incorporated by reference herein.

BACKGROUND OF THE PRESENT INVENTION

1. Field of the Present Invention

The present invention relates to an ink set for ink-jet recording, an ink-jet recording method and an ink-jet recording apparatus.

2. Description of the Related Art

So-called ink-jet methods for ejecting a liquid or molten solid ink through an ink discharging port such as a nozzle, slit or porous film have been used for many printers since a printer using such a method is compact and inexpensive. A piezo ink-jet method for ejecting an ink by taking advantage of deformation of a piezoelectric element, a thermal ink-jet method for ejecting an ink by taking advantage of boiling of the ink by thermal energy, and the like are frequently used among the ink-jet methods since these methods enable high-resolution, high-speed printing. Ink-jet printers are used for printing on a paper sheet such as a regular paper sheet or an inkjet paper sheet as well as on a film such as an OHP sheet and on cloth.

One of the currently important objects of the ink-jet printer is high speed and high quality printing of images. For attaining compatibility between high speed printing and high quality printing of an image, Japanese Patent No. 2667401 discloses a method comprising the steps of allowing a liquid containing a cationic group-bearing compound to adhere on a recording medium, allowing the liquid to permeate into the recording medium, and forming an image by allowing an anion dye-containing ink to adhere on the surface of the recording medium immediately after the liquid has been absorbed into the recording medium and has disappeared from the surface thereof. However, image density may be insufficient in this method when the drying time of the ink is shortened, and long-term reliability may be insufficient when the images are printed using a small volume of drops.

Japanese Patent Application Laid-Open (JP-A) No. 2001-294788 discloses a color ink set for attaining high speed drying, high optical density and high image quality, wherein a black ink contains water and water-soluble solvents, the drying time of the black ink on a regular paper sheet is not longer than 5 seconds, color inks contain colorants, water, water-soluble solvents and a coagulant for coagulating the components in the black ink, and permeation time of the color inks into the regular paper sheet is not longer than 5 seconds. Although optical density, feathering and intercolor bleeding are excellent when pigments are used for colorants of the color inks in this method, long-term storability of images may not always be sufficient since the ink contains the coagulant.

JP-A No. 5-202328 discloses an ink composition containing synthetic dye materials having carboxylic groups, and an image forming method using a polyvalent metal solution in which the ink composition is applied after applying the polyvalent metal solution in order to provide a stable and water-resistant image without causing color bleeding. However, stable long-term storability of the ink may be deteriorated by adding a pigment in the polyvalent metal solution in this method.

As hitherto described, it has been impossible to simultaneously satisfy optical density, feathering, intercolor bleeding, drying time and long-term reliability by the conventional methods.

SUMMARY OF THE PRESENT INVENTION

The present invention has been made in view of the above circumstances and provides a first aspect of the present invention which is an ink set for ink-jet recording using at least two kinds of inks, wherein: the ink set comprises a first ink containing at least a pigment, a water-soluble solvent and water, and a second ink containing at least a pigment, a coagulant a water-soluble solvent and water; and an absolute value of ζ-potential of the second ink is not less than 10 mV.

A second aspect of the present invention is an ink-jet recording method using a first ink containing at least a pigment, a water-soluble solvent and water, and a second ink containing at least a pigment, a coagulant, a water-soluble solvent and water and having an absolute value of ζ-potential of not less than 10 mV, wherein an image is formed by applying the first-ink and second ink on a recording medium so as to contact to each other.

A third aspect of the present invention is an ink-jet recording apparatus comprising a recording head for ejecting each ink in an ink set for ink-jet recording, the ink set for ink-jet recording comprising at least two kinds of inks, wherein: a first ink contains at least a pigment, a water-soluble solvent and water, and a second ink contains at least a pigment, a coagulant, a water-soluble solvent and water; and the second ink has an absolute value of ζ-potential of not less than 10 mV.

DETAILED DESCRIPTION OF THE PRESENT INVENTION

The first to third embodiments of the present invention provide an ink set for ink-jet recording, an ink-jet recording method and ink-jet recording apparatus using the ink set which is excellent in optical density, feathering, intercolor bleeding, drying time and long-term reliability.

As other embodiments of the invention, fourth to twenty-seventh embodiments will be described below.

The fourth embodiment of the present invention is an ink set for ink-jet recording according to the first embodiment, wherein: the pigment in the second ink is at least one selected from the group consisting of a self-dispersible pigment having at least sulfonic acid or a sulfonate salt as functional groups on a surface of the pigment, and a pigment dispersed using a dispersant having sulfonate groups; and the coagulant is an electrolyte.

The fifth embodiment of the present invention is an ink set for ink-jet recording according to the fourth embodiment, wherein the coagulant is a polyvalent metal salt.

The sixth embodiment of the present invention is an ink set for ink-jet recording according to the first embodiment, wherein: the pigment in the second ink is at least one selected from the group consisting of a self-dispersible pigment having at least carboxylic acid or a carbonate salt on a surface of the pigment as functional groups and a pigment dispersed using a dispersant having carboxylate groups, and the coagulant is a monovalent electrolyte.

The seventh embodiment of the present invention is an ink set for ink-jet recording according to the first embodiment, wherein: the pigment in the second ink has functional groups on a surface of the pigment; and an amount of the functional groups on the surface of the pigment in the second ink is not less than 0.3 mmol/g based on an amount of the pigment in the second ink.

The eighth embodiment of the present invention is an ink set for ink-jet recording according to the first embodiment, wherein: each pigment in the first and second inks is at least one selected from the group consisting of a pigment dispersed with a polymer dispersant, a self-dispersible pigment, and a pigment coated with a resin; and the pigment in the first ink is carbon black and the pigment in the second ink is an organic pigment, or the pigment in the first ink is an organic pigment and the pigment in the second ink is carbon black.

The ninth embodiment of the present invention is an ink set for ink-jet recording according to the eighth embodiment, wherein a surface tension of the ink containing the carbon black is not less than 20 mN/m and not larger than 60 mN/m, and/or a surface tension of the ink containing the organic pigment is not less than 20 mN/n and not larger than 45 mN/m.

The tenth embodiment is an ink set for ink-jet recording according to the first embodiment, wherein the first ink further contains a resin having a carboxylic acid or a carboxylate salt.

The eleventh embodiment of the present invention is an ink set for ink-jet recording according to the first embodiment, wherein a volume average particle diameter of a pigment particles in each of the first and second inks is not less than 30 nm and not larger than 250 nm.

The twelfth embodiment of the present invention is an ink set for ink-jet recording according to the first embodiment, wherein a viscosity of each of the first and second inks is not less than 1.2 mPa·s and not larger than 8.0 mPa·s.

The thirteenth embodiment of the present invention is an ink set for ink-jet recording according to the first embodiment, wherein a number of particles having a diameter of not less than 5 μm in a mixed solution of equal amounts by mass of the first and second inks is not less than 1,000 particles/μL.

The fourteenth embodiment of the present invention is an ink set for ink-jet recording according to the first embodiment, wherein an absolute value of $\zeta$-potential of the first ink is not less than 5 mV, and/or an absolute value of $\zeta$-potential of the pigment in the second ink is not less than 30 mV in an aqueous dispersion solution.

The fifteenth embodiment of the present invention is an ink set for ink-jet recording according to the first embodiment, wherein: a first ink containing at least one selected from the group consisting of a pigment dispersed with a polymer dispersant, a self-dispersible pigment and a resin-coated pigment and further containing a water-soluble solvent, water and a resin containing a carboxylic acid or a carboxylate salt; and a second ink containing a pigment having sulfonic acid or a salt thereof as a surface functional group, a polyvalent metal salt, a water-soluble solvent and water, and
the first ink has
(i) a surface tension of not less than 20 mN/m and not larger than 60 mN/m,
(ii) an absolute value of $\zeta$-potential of not less than 5 mV,
(iii) a viscosity of not less than 1.2 mPa·s and not larger than 8.0 mPa·s, and
(iv) a volume average particle diameter of not less than 30 nm and not larger than 250 nm; and
the second ink has
(v) a surface tension of not less than 20 mN/m and not larger than 45 mN/m,
(vi) an absolute value of $\zeta$-potential of not less than 10 mV,
(vii) a $\zeta$-potential of the pigment in the ink of not less than 30 mV,
(viii) a viscosity of not less than 1.2 mPa·s and not larger than 8.0 mPa·s, and
(ix) a volume average particle diameter of not less than 30 nm and not larger than 250 nm.

The sixteenth embodiment of the present invention is an ink-jet recording method according to the second embodiment wherein: the pigment in the second ink is at least one selected from the group consisting of a self-dispersible pigment having at least sulfonic acid or a sulfonate salt on a surface of the pigment as functional groups, and a pigment dispersed using a dispersant having sulfonate groups; and the coagulant is a polyvalent metal salt.

The seventeenth embodiment of the present invention is an ink-jet recording method according to the second embodiment, wherein: the pigment in the second ink is at least one selected from the group consisting of a self-dispersible pigment having at least carboxylic acid or a carboxylate salt on the surface of the pigment as functional groups, and a pigment dispersed using a dispersant having carboxylate groups; and the coagulant is a monovalent electrolyte.

The eighteenth embodiment of the present invention is an ink-jet recording method according to the second embodiment, wherein: the first ink and second ink are applied on a recording medium in a quantity of not larger than 25 ng per 1 drop; and the proportion of a quantity of the first ink applied for forming one pixel on the recording medium relative to an applied quantity of the second ink is not less than 0.1 and not larger than 10.

The nineteenth embodiment of the present invention is an ink-jet recording apparatus according to the third embodiment, wherein an image is formed by applying the first ink and second ink on a recording medium so as to contact to each other.

The twentieth embodiment of the present invention is an ink-jet recording apparatus according to the third embodiment, wherein: the first ink and second ink are applied on a recording medium in a quantity of not larger than 25 ng per 1 drop; and the proportion of a quantity of the first ink applied for forming one pixel on the recording medium relative to an applied quantity of the second ink is not less than 0.1 and not larger than 10.

The twenty-first embodiment of the present invention is an ink-jet recording method according to the second embodiment, wherein the first ink is applied after applying the second ink on the recording medium.

The twenty-second embodiment of the present invention is an ink-jet recording method according to the second embodiment, wherein the second ink is applied after applying the first ink on the recording medium.

The twenty-third embodiment of the present invention is an ink-jet recording apparatus according to the third embodiment, wherein the pigment in the second ink is at least one selected from the group consisting of a self-dispersible pigment having at least sulfonic acid or a sulfonate salt as functional groups on a surface of the pigment, and a pigment dispersed using a dispersant having sulfonate groups; and the coagulant is an electrolyte.

The twenty-fourth embodiment of the present invention is an inkjet recording apparatus according to the twenty-third embodiment, wherein the coagulant is a polyvalent metal.

The twenty-fifth embodiment of the present invention is an ink-jet recording apparatus according to the third embodiment, wherein the pigment in the second ink is at least one selected from the group consisting of a self-dispersible pigment having at least carboxylic acid or a carbonate salt on a surface of the pigment as functional groups and a pigment dispersed using a dispersant having carboxylate groups, and the coagulant is a monovalent electrolyte.

The twenty-sixth embodiment of the present invention is an ink-jet recording apparatus according to the third embodiment, wherein the first ink is applied on the recording medium after applying the second ink.

The twenty-seventh embodiment of the present invention is an ink-jet recording apparatus according to the third embodiment, wherein the second ink is applied on the recording medium after applying the first ink.

Either organic pigments or inorganic pigments may be used for the pigment used in the present invention. Examples of black pigments include carbon black pigments such as furnace black, lamp black, acetylene black and channel black. In addition to the black pigment and three primary color pigments (cyan, magenta and yellow), a specific color pigment (for example, red, green, blue, brown and white), a metallic luster pigments of gold and silver color etc., an extender pigment of colorless or light color, and a plastic pigments may be used. The pigment may be a novel synthetic pigment.

It is also possible in the present invention to use particles prepared by adhering a dye or pigment on the surface of a silica, alumina or polymer beads cores, insolubilized lakes of dyes, colored emulsion and colored latex as the pigment.

Examples of the black pigment include Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080 and Raven 1060 (manufactured by Columbian Chemicals Company); Regal 400R, Regal 330R, Regal 660R, Mogul L, Black Pearls L, Monarch 700, Monarch 800, Monarch 880, Monarch 900, Monarch 1000, Monarch 1100, Monarch 1300 and Monarch 1400 (manufactured by Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by Degussa Co.); and No. 25, No. 33, No. 40, No. 47, No. 52, No. 900, No. 2300, MCF-88, MA 600, MA 7, MA 8 and MA 100 (manufactured by Mitsubishi Chemical Co., Ltd.). However, the pigments are not restricted thereto.

While examples of the cyan pigment include C.I. Pigment Blue-1, -2, -3, -15, -15:1, -15:2, -15:3, -15:4, -16, -22 and -60, the pigments are not restricted thereto.

While examples of the magenta pigment include C.I. Pigment Red-5, -7, -12, -48, -48:1, -57, -112, -122, -123, -146, -168, -184 and -202, the pigments are not restricted thereto.

While examples of the yellow pigment include C.I. Pigment Yellow-1, -2, -3, -12, -13, -14, -16, -17, -73, -74, -75, -83, -93, -95, -97, -98, -114, -128, -129, -138, -151, -154, and -180, the pigments are not restricted thereto.

The self-dispersible pigments used in the present invention refer to such pigments having many water-solubilizing groups on the surface of the pigment, and being capable of stably dispersing in water without adding any polymer dispersants. In particular, the self-dispersible pigment in water is obtained by subjecting the conventional pigments to surface modification treatment such as acid or base treatment, coupling agent treatment, polymer graft treatment, plasma treatment and redox treatment.

In addition to the surface-modified pigments described above, commercially available pigments such as Cab-o-jet-200, Cab-o-jet-300, IJX-253, IJX-266, IJX-273, IJX-444 and IJX-55 (manufactured by Cabot Corporation), and Microjet Black CW-1 and CW-2 (manufactured by Orient Chemical Industries, Ltd.) may also be used as the self-dispersible pigment in water.

A polymer substance may be added in the solution when the self-dispersible pigment in water is used as the pigment.

The self-dispersible pigment used in the present invention preferably has functional groups such as sulfonic acid, sulfonate salts, carboxylic acid or carboxylate salts on the surface. More preferably, the pigment has at least sulfonic acid or sulfonate salts on the surface as the functional group.

Alternatively, the pigment used may be coated with a resin. Such pigment is called as a microcapsule pigment, and examples of the pigment include microcapsule pigments such as those commercially available from Dainippon Ink & Chemicals, Inc. and TOYO INK MFG. Co., Ltd., as well as microcapsule pigments prepared for use in the present invention.

The pigment is used in a proportion in the range of not less than 0.1% by mass and not larger than 20% by mass, preferably in the range of not less than 1% by mass and not larger than 10% by mass, relative to the total mass of the ink in both the first ink or the second ink. Sufficient optical density is not obtained in some cases when the content of the pigment in the ink is less than 0.1% by mass, and ejection characteristics of the ink may be unstable when the content of the pigment is larger than 20% by mass.

A polymer dispersant may be used in the present invention for dispersing the pigment. A polymer dispersant may be added as the polymer substance when the self-dispersible pigment in water is used. The polymer dispersants available include am nonionic compound, an anionic compound, a cationic compound and an amphoteric compound, for example a copolymer of monomers having $\alpha,\beta$-ethylenic unsaturated groups. This copolymer may be either a random, block or graft copolymer.

Examples of the monomer of anionic compound having the $\alpha,\beta$-ethylenic unsaturated group include acrylic acid, methacrylic acid, crotonic acid, itaconic acid, itaconate monoester, maleic acid, maleate monoester, fumaric acid, fumarate monoester, vinyl sulfonic acid, styrene sulfonic acid, sulfonated vinyl naphthalene, vinyl alcohol, acrylamide, methacryloxyethyl phosphate, bismethacryloxyethyl phosphate, methacryloyyethyl phenyl acid phosphate, ethyleneglycol dimethacrylate, diethyleneglycol dimethacrylate, styrene, styrene derivatives such as α-methylstyrene and vinyltoluene, vinylcyclohexane, vinylnaphthalene, vinylnaphthalene derivatives, alkyl acrylate, phenyl acrylate, alkyl methacrylate, phenyl methacrylate, cycloalkyl methacrylate, alkyl crotonate, dialkyl itaconate and dialkyl maleate.

The copolymer obtained by copolymerization of one kind of the monomer or plural kinds of monomers having the α,β-ethylenic unsaturated groups may be used as the polymer dispersant. Examples of the polymer dispersant include styrene-styrene sulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthaleneacrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer.

Examples of the nonionic polymer dispersant include polyoxyalkylene alkyl ether and polyoxethylene alkylphenyl ether.

Examples of the cationic polymer dispersant include copolymers of N,N-dimethylaminoethyl methacrylate, N,N-dimethylaminoethyl acrylate, N,N-dimethylamiomethacrylamide, N,N-dimethylaminoacrylamide, N-vinylpyrrole, N-vinylpyridine, N-vinylpyrrolidone, and N-vinylimidazole; and monoalkylamine, monoalkyl dimethylamine, alkyl propyldiamine, alkyl dipropyltriamine, alkyl tripropyltetramine, polyoxyethylene alkylmethylbenzyl ammonium salt, alkylamine acetate and tetraalkylammonium chloride.

The amphoteric polymer dispersant include betaine compounds.

The polymer dispersant used in the present invention preferably has a weight average molecular weight of not less than 2000 and not larger than 15,000. Stable dispersion of the pigment may be impossible when the molecular weight of the polymer dispersant is less than 2,000, while ejectability may be deteriorated due to high viscosity when the molecular weight exceeds 15,000. The more preferable weight average molecular weight is 3,500 to 10,000.

When the polymer dispersant is used in the second ink of the present invention, the functional group of the polymer dispersant preferably has sulfonic acid, sulfonate group, carboxylic acid or carboxylate group, more preferably sulfonic acid or sulfonate group, as the functional group. This is because long-term storability may be deteriorated when the polymer dispersant used has the carboxylic acid or carboxylate salts as the functional group.

The range of use of the polymer dispersant added in the solution is not less than 0.1% by mass and not larger than 3% by mass in both the first and second inks. Ejection characteristics of the liquid may be unstable due to high viscosity of the solution when the amount of addition of the polymer dispersant exceeds 3% by mass. On the other hand, dispersion stability of the pigment may be decreased when the amount of addition of the polymer dispersant is less than 1% by mass. The amount of addition of the polymer dispersant is more preferably not less than 0.15% by mass and not larger than 2.5% by mass, further preferably not less than 0.2% by mass and not larger than 2% by mass.

The density of the functional group on the surface of the pigment in the second ink is preferably not less than 0.3 mmol/g, more preferably not less than 0.45 mmol/g, and further preferably not less than 0.65 mmol/g. Long term reliability may be decreased when the density of the functional group on the surface of the pigment is less than 0.3 mmol/g.

The surface density of the functional group is determined as following measuring method in the present invention. When the pigment is dispersed using the dispersant, the amount of the dispersant required for dispersing the pigment is measured, and the surface density of the functional group is calculated from the amount of addition of the dispersant. When the pigment is an anionic self-dispersible pigment, on the other hand, the pigment is coagulated by decreasing the pH of the pigment dispersion solution. Then, the precipitate is washed with pure water, and the pigment is dispersed again by dispersing with stirring using a high pressure homogenizer while the solution is titrated with a known concentration of an aqueous alkali solution such as an aqueous sodium hydroxide solution. The surface density of the functional group is calculated from the concentration of the pigment in the dispersion solution, and from the amount of addition of sodium hydroxide.

While the surface density of the functional group of the pigment in the first ink is not particularly restricted, it is preferably not less than 0.1 mmol/g and not larger than 1.5 mmol/g, more preferably not less than 0.2 mmol/g and not larger than 1.0 mmol/g. When the surface density of the functional group of the pigment in the first ink is less than 0.1 mmol/g, long-term reliability of the ink may be deteriorated, while optical density, feathering and intercolor bleeding may be impaired when the density exceeds 1.5 mmol/g.

The same pigment may be used in the first and second inks. However, it is preferable to use different pigments, for example carbon black in one ink and an organic pigment in another ink.

While at least two pigments may be used together in each of the first and second inks, it is more preferable to use a single kind of the pigment in each ink.

The water-soluble solvent used in the present invention is a water-soluble organic solvent, for example polyhydric alcohols, polyhydric alcohol derivatives, nitrogen-containing solvents, alcohols and sulfur-containing solvents. Examples of the water-soluble organic solvent include polyhydric alcohols such as ethyleneglycol, diethyleneglycol, propyleneglycol, butyleneglycol, triethyleneglycol, 1,5-pentanediol, 1,2,6-hexanetriol and glycerine. Examples of the polyhydric alcohol include ethyleneglycol monomethylether, ethyleneglycol monoethylether, ethyleneglycol monobutylether, diethyleneglycol monomethylether, diethyleneglycol monoethylether, diethyleneglycol monobutylether, propyleneglycol monobutylether, dipropyleneglycol monobutylether, and diglycerin-ethylene oxide adduct. Examples of the nitrogen-containing solvent include pyrolidone, N-methyl-2-pyrrolidone, cyclohexyl pyrrolidone and triethanolamine; examples of alcohol include ethanol, isopropyl alcohol, butyl alcohol and benzyl alcohol; and examples of the sulfur-containing solvent include thiodiethanol, thiodiglycerol, sulfolane and dimethylsulfoxide. Propylene carbonate and ethylene carbonate may be also used.

At least one kind of the water-soluble organic solvent is used in the present invention. The content of the water-soluble organic solvent is not less than 1% by mass and not larger than 60% by mass, preferably not less than 5% by mass and not larger than 40% by mass. Sufficient optical density is not obtained when the content of the water-soluble organic solvent in the ink is less than 1% by mass, while ejection characteristics may be unstable due to high viscosity of the solution when the content exceeds 60% by mass.

A surfactant may be used in the present invention. The surfactant effectively used in the present invention is a compound having a hydrophilic portion and hydrophobic portion together in the molecule, and any one of the anionic, cationic, amphoteric and nonionic surfactants is available. The polymer dispersant may be also used.

Examples of the anionic surfactant include alkylbenzene sulfonate, alkylphenyl sulfonate and alkylnaphthalene sulfonate, sulfate esters of higher fatty acid salts or higher fatty acid esters, sulfonates of higher fatty acid esters, sulfate esters or sulfonates of higher alcohol ethers, higher alkyl sulfosuccinates, higher alkyl phosphate, and phosphate esters of higher alcohol-ethylene oxide adduct. As examples of them, dodecylbenzene sulfonate, alkylbenzene sulfonate, isopropylnaphthalene sulfonate, monobutylphenylphenol monosulfonate, monobutylbiphenyl sulfonate and dibutylphenylphenol disulfonate may be effectively used.

Examples of the nonionic surfactant include polypropyleneglycol-ethylene oxide adduct, polyoxyethylene nonylphenylether, polyoxyethylene octylphenylether, polyoxyethylene dodecylphenylether, polyoxyethylene alkylether, polyozyethylene fatty acid ester, sorbitan fatty acid ester, polyoxyethylene sorbitan fatty acid ester, fatty acid alkylolamide, acetyleneglycol, acetyleneglycol oxyetylene adduct, fatty acid alanolamide, glycerin ester and sorbitan ester.

Examples of the cationic surfactant include tetraalkyl ammonium salt, alkylamine salt, benzalkonium salt, alkyl pyidium salt and imidazolium salt, specifically dihydroxyethyl stearylamine, 2-heptadecenyl hydroxyethyl imidazoline, lauryldimethylbenzyl ammonium chloride, cetylpyridinium chloride and stearamide methylpyridium chloride.

Bio-surfactants such as spicrispolic acid, rhamnolipid and lysolecithin may be also used.

The amount of the surfactant added in the ink of the present invention is preferably less than 10% by mass, more preferably not less than 0.01% by mass and not larger than 5% by mass, and further preferably not less than 0.01% by mass and not larger than 3% by mass. Optical density and stable storability of the pigment ink may be deteriorated when the amount of addition of the surfactant is not less than 10% by mass.

Any compounds may be used as the coagulant of the present invention, so long as the compound is able to form a water insoluble compound with the constituents of the first ink.

When the first ink has a pigment having an anionic group on the surface of the pigment in the ink, the second ink preferably contains an electrolyte or a cationic compound. The pigment having the anionic group on the surface may include a pigment having an anionic polymer dispersant adsorbed on the surface of the pigment in addition to the self-dispersible pigment having the anionic group on the surface thereof.

Examples of the electrolytic coagulant include monovalent metal ions such as lithium ion, sodium ion and potassium ion; polyvalent metal ions such as aluminum ion, barium ion, calcium ion, copper ion, iron ion, magnesium ion, manganese ion, nickel ion; tin ion, titanium ion and zinc ion; inorganic acids such as hydrochloric acid, hydrobromic acid, hydriodic acid, sulfric acid, nitric acid, phosphoric acid and thiocyanic acid; organic carboxylic acids such as acetic acid, oxalic acid, lactic acid, fumaric acid, succinic acid, salicylic acid and benzoic acid; and organic sulfonic acid salts.

Examples of the electrolyte include monovalent electrolytes such as lithium chloride, sodium chloride, potassium chloride, sodium bromide, potassium bromide, sodium iodide, potassium iodide, sodium sulfate, potassium nitrate, sodium acetate, potassium oxalate, sodium citrate and potassium benzoate; and polyvalent metal salts such as aluminum chloride, aluminum bromide, aluminum sulfate, aluminum nitrate, sodium aluminum sulfate, potassium aluminum sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium benzoate, calcium acetate, calcium salicylate, calcium tariarate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate and zinc acetate.

Examples of the cationic compound include primary, secondary, tertiary and quaternary amines, and salts thereof. Examples of them include tetraalkylammonium salts, alkyamine salts, benzalkonium salts, alkylpyridium salts, imidazolium salts and polyamines, and specific examples of them include isopropylamine, isobutylamine, t-butylamine, 2-ethylhexylamine, nonylamine, dipropylaine, diethylamine, trimethylamine, triethylamine, dimethylpropylamine, ethylenediamine, propylenediamine, hexamethylenediamine, diethylenetriamine, tetraethylenepentamine, diethanolamine, diethyl ethanolamine, triethanolamine, tetramethylammonium chloride, tetramethylammonium bromide, dihydroxyethyl stearylamine, 2-heptadecenyl hydroxyethyl imidazoline, lauryl dimethylbenzylammonium chloride, cetylpyridinium chloride, stearamide methylpyridium chloride, diaryldimethyl ammonium chloride polymer, diallylamine polymer and monoallylamine polymer.

Preferable electrolytes are polyvalent metal salts, and examples thereof include aluminum sulfate, calcium chloride, calcium nitrate, calcium acetate, magnesium chloride, magnesium nitrate, magnesium sulfate, magnesium acetate, tin sulfate, zinc chloride, zinc nitrate, zinc sulfate, zinc acetate and aluminum nitrate. Examples of preferable cationic compound include monoallylamine polymer, diallylamine polymer and diallydimethyl ammonium chloride polymer.

The second ink preferably contains an anionic compound when the first ink contains a pigment having cationic groups on the surface. The pigment having the cationic group on the surface may include pigment having a cationic polymer dispersant adsorbed on the surface of the pigment in addition to a self-dispersible pigment having the cationic group on the surface thereof.

Examples of the coagulant of anionic compound effectively used in the present invention include organic carboxylic acids and organic sulfonic acids, and salts thereof. Specific examples of the organic carboxylic acid include acetic acid, oxalic acid, lactic acid, fumaric acid, citric acid, salicylic acid and benzoic acid, and oligomers and polymers having a plurality of these organic carboxylic acids in the basic structure may be available, Examples of the organic sulfonic acids include benzenesulfonic acid and toluenesulfonic acid, and oligomers and polymers having a plurality of these organic sulfonic acids in the basic structure may be available.

The coagulant may be used single, or as a mixture of at least two of them in the present invention. The content of the coagulant in the second ink is preferably not less than 0.01% by mass and not larger than 15% by mass, more preferably not less than 0.1% by mass and not larger than 10% by mass.

Resins having a carboxylic acid or carboxylate may be used in the first ink for improving coagulability. The resin may be either water soluble or water insoluble.

Compounds that can be added in each of the first and second for improving ejectability include polyethylene imine, polyamine, polyvinylpyrrolidone, polyethyleneglycol, cellulose derivatives such as ethyl cellulose and carboxymethyl cellulose, polysaccharides and derivatives thereof, other water-soluble polymers, polymer emulsions such as acrylic polymer emulsions, polyurethane emulsions and hydrophilic latex, hydrophilic polymer gel, cyclodextrin, macrocyclic amines, dendrimers, crown ethers, urea and derivatives thereof, acetamide, silicone-containing surfactants and fluorine-containing surfactants. Compounds that may be added for controlling conductivity and pH include alkali metal compounds such as potassium hydroxide, sodium hydroxide and lithium hydroxide; nitrogen-containing compounds such as ammonium hydroxide, triethanolamine, diethanolamine, ethanolamine, 2-amino-2-methyl-1-propanol; alkali earth metal compounds such as calcium hydroxide; acids such as sulfuric acid, hydrochloric acid and nitric acid; and salts between a strong acid and an alkalescent such as ammonium sulfate.

Other additives such as a pH buffer, antioxidant, antifungal agent, viscosity control agent, conductive material and UV absorber may be added, if necessary.

The recording material of the present invention can be used for usual ink-jet recording apparatuses and recording apparatuses mounting a heater for controlling drying of the ink and recording apparatuses mounting an intermediate transfer mechanism for transferring an image printed on an intermediate member onto a recording medium such as a paper sheet.

Methods for improving image quality such as optical density and prevention of feathering have been proposed by taking advantage of a coagulation reaction between the coagulant in a liquid composition and other ink components. However, since the pigment is coagulated by the effect of the coagulant when the pigment is added in the liquid composition for utilizing this method to a reaction among the inks of the pigment ink system, it has been a problem that stable long-term storability cannot be assured.

It is found in the present invention that the characteristics such as optical density, feathering, intercolor bleeding and stable long-term storability can be improved by adjusting a combination among the functional groups on the surface of the pigment in the second ink, coagulant and composition of the first ink.

It is important for stabilizing the dispersion state of the composition of the second ink to adjust the absolute value of $\zeta$-potential of the ink to be, not less than 10 mV. The composition of the ink is not particularly restricted so long as the absolute value of $\zeta$-potential of the entire second ink is not less than 10 mV. An electrolyte is preferably used as the coagulant when the pigment used has sulfonic acid or sulfonate salt as the surface functional group. The polyvalent metal salt is particularly preferable among the electrolyte.

On the other hand, a monovalent electrolyte is preferably used as the coagulant when a pigment having carboxylic acid or carboxylate salt as the surface functional group is used in the second ink.

While the composition of the first ink is not particularly restricted, the pigments in the first ink is preferably combined so that they can be rapidly coagulated by the action of the coagulant in the second ink. The first ink preferably has an absolute value of $\zeta$-potential of not larger than 5 mV.

Although the mechanism by which the above-described phenomena occurs is not entirely clear, it is conjectured to be as follows.

The pigment is considered to be dispersed mainly by an electrostatic repulsion force among the pigments generated by the surface charge of the pigment in a dispersion system such as the pigment dispersion solution. However, when an electrolyte is added to the dispersion system, electric double layers formed by the surface charge of the pigment are compressed, and electrostatic repulsion force among the pigments are decreased, whereby the pigment is coagulated. The compression ratio of the electric double layer is different depending on the kind of the electrolyte. It is known that the compression ratio of the electric double layer is inversely proportional to the square of the charge of the electrolyte in other word, the compression ratio of the electrical double layer caused by adding a divalent electrolyte is calculated to be ¼ as small as that caused by adding a monovalent electrolyte in the same amount as the divalent electrode, and coagulation is further accelerated in the former case. This means that the combination between the pigment and coagulant should be adjusted depending on the magnitude of dissociation of functional groups on the surface of the pigment. For example, the monovalent electrolyte having a lower coagulation force is preferably used as the coagulant when a pigment having a surface functional group having a smaller dissociation constant such as a carboxylic acid or carboxylate salt is used. On the other hand, using either the monovalent electrolyte or polyvalent electrolyte as the coagulant is possible when a pigment having a surface functional group having a larger dissociation constant such as sulfonic acid or sulfonate salt is used.

The carboxylic acid also exhibits an effect for extinguishing the charge of the carboxylic acid itself since it forms a complex or chelate structure with the polyvalent metal salt. In addition, since a cross-linking structure is formed by forming the complex or chelate structure between the polyvalent electrolyte and plural carboxylic acids, the distance between the pigments is shortened to accelerate coagulation. Accordingly, coagulation is conjectured to be further accelerated when the pigment having the carboxylic acid or carboxylate salt as the surface functional group and the polyvalent metal salt are used together, because the polyvalent metal salt functions not only to provide a coagulation effect by compression of the electric double layer but also to extinguish the charge itself.

Accordingly, the combination of the coagulant and the pigment is important for ensuring long-term reliability. On the other hand, characteristics such as optical density and feathering are also considered to be improved by coagulation of the pigment in the first ink when the first ink and the second ink are mixed. Accordingly, the combination of the coagulant in the second ink and the composition of the first ink is also important. The mechanism for improving these characteristics is conjectured to be that the pigment in the first ink is coagulated on the recording medium, and is localized in a high density on the recording medium. That is, a combination in which the pigment in the first ink is rapidly coagulated by the action of the coagulant in the second is preferable. Since the relationship between the surface functional group and coagulant is also present between the first ink and the second ink, characteristics such as optical density and feathering is improved by a combination exhibiting a larger coagulation force.

The compositions of the inks should be adjusted so that the coagulant in the second ink has a smaller coagulation force against the pigment in the second ink while having a larger coagulation force against the pigment in the first ink.

The absolute value of ζ-potential of the second ink is preferably not less than 10 mV, more preferably not less than 15 mV, and further preferably not less than 20 mV and not larger than 60 mV in the present invention. Stable storability cannot be secured when the absolute value of ζ-potential is less than 10 mV.

The absolute value of ζ-potential of the second ink of the present invention comprising an aqueous dispersion of the pigment only is preferably not less than 30 mV, more preferably not less than 35 mV, and further preferably not less than 40 mV. Stable storability cannot be also secured when the absolute value of ζ-potential of the second ink comprising an aqueous dispersion of the pigment only is less than 30 mV.

The absolute value of ζ-potential of the first ink is preferably not less than 5 mV, more preferably not less than 7.5 mV and not larger than 60 mV, and fixer preferably not less than 10 mV and not larger than 50 mV. Stable storability cannot be secured when the absolute value of ζ-potential of the first ink is less than 5 mV.

The ζ-potential is measured in the present invention using an ESA method that is able to measure the ζ-potential of a thick ink solution without dilution.

$$\zeta\text{-potential} = \frac{ESA \times \eta \times G(\alpha)^{-1}}{\varepsilon \times c \times \Delta\rho \times V} \quad (1)$$

In equation (1), ESA denotes a factor representing a pressure per unit electric field that is determined by measurement. η denotes the viscosity of the solvent, $G(\alpha)^{-1}$ denotes a correction term of an action due to an inertia force, ε denotes dielectric constant of the solvent, c denotes a sonic velocity in the solvent, Δρ denotes a density difference between the solvent and particles, and V denotes a volume fraction of the particles.

The ζ-potential is determined in the present invention using the viscosity of the ink as η, the dielectric constant of water as ε, the density difference between the pigment and water as Δρ, and the volume fraction of the pigment as V. The ζ-potential is measured with ESA-8000 (trade name, manufactured by Matec Applied Science Co.) as the apparatus according to a predetermined measuring method in such a manner that 100 ml of the ink is placed in a prescribed vessel, and a measuring probe is immersed a specified amount of ink.

The volume average particle diameter of the pigment in each of the first and the second inks is preferably not less an 30 nm and not larger than 250 nm in the present invention. The volume average particle diameter of the pigment denotes the particle diameter of the pigment itself, or the particle diameter of the pigment included additives when the additives such as the dispersant are adsorbed on a surface of the pigment. Micro-track UPA particle diameter analyzer 9340 (trade name, manufactured by Leeds & Northrup Co.) is used in order to measure the average particle diameter in the present invention. The average particle diameter is measured according to a predetermined measuring method by filling 4 ml of the ink in a measuring cell. As the parameters for measurement, the viscosity of the ink is inputted as the value of viscosity and the density of the pigment is inputted as the density value of the dispersed. The average particle diameter is preferably not less than 50 nm and not larger than 200 nm, more preferably not less than 75 nm and not larger than 175 nm. The optical density may decrease when the average particle diameter of the particles in the ink is less than 30 nm, while stable storability cannot be secured when the average particle diameter exceeds 250 nm.

The surface tension of the ink containing carbon black is preferably not less than 20 mN/m and not larger than 60 mN/m, more preferably not less than 22.5 mN/m and not larger than 45 mN/m, and further preferably not less than 25 mN/m and not larger than 35 mN/n in the present invention.

When the face tension is less than 20 mN/m, the liquid may overflow onto the nozzle surface, whereby normal printing may be inhibited, on the other hand, permeation may be retarded to prolong the drying time when the surface tension exceeds 60 mN/m.

The surface tension of the ink containing the organic pigment is preferably not less than 20 mN/m and not larger than 45 mN/m, more preferably not less than 22.5 mN/m and not larger than 40 mN/n, and further preferably not less than 25 mN/m and not larger than 35 mN/m in the present invention.

When the surface tension is less than 20 mN/m, the liquid may overflow onto the nozzle surface, whereby normal printing may be inhibited, on the other hand, permeation may be retarded to prolong the drying time when the surface tension exceeds 45 mN/m.

The viscosity of each of the first and the second inks is preferably not less than 1.2 mPa·s and not larger than 8.0 mPa·s, more preferably not less than 1.5 mPa·s and less than 6.0 mPa·s, and further preferably not less than 1.8 mPa·s and less than 5.0 mPa·s in the present invention. Ejectability may be deteriorated when the viscosity of the first and second inks is larger than 8.0 mPa·s, while long-term reliability may be impaired when the viscosity is smaller than 1.2 mPa·s.

The quantity of the ink per one drop is preferably not larger than 25 ng, more preferably not less than 0.5 ng and not larger than 20 ng, and further preferably not less than 1 ng and not larger than 8 ng. Feathering may be increased when the quantity of the ink per one drop exceeds 25 ng because, since the contact angle of the first and second inks to the recording medium changes depending on the quantity of the ink in one drop, the ink tends to be spread on the surface of the paper sheet when the quantity of the ink in one drop increases.

However, the quantity of the ink in one drop refers to the minimum quantity of the ink in one drop capable of printing in an ink-jet printer that is able to eject plural drops having different volumes with each other from one nozzle.

The first ink preferably contacts the second ink when the inks are applied on the recording medium. The inks are coagulated by the action of the coagulant when the first ink contacts the second ink to enable recording with excellent optical density, feathering, intercolor bleeding and drying time.

The order for applying the ink on the recording medium is not particularly restricted. However, it is preferable to apply the first ink after the second ink has been applied, because permeation of the pigment into the recording medium may be suppressed by adhesion of the coagulant contained in the second ink onto the recording medium.

The proportion of the amount of application of the first ink required for forming one pixel is preferably not less than 0.1 and not larger than 10, more preferably not less than 0.2 and not larger than 5, relative to the amount of application of the second ink. When the proportion of the amount of application of the first ink is less than 0.1 or exceeds 10 relative to the amount of application of the second ink, optical density may be decreased and feathering and intercolor bleeding may be deteriorated due to insufficient coagulation.

Inks having different color densities, or deep and pale colors, of the same color may be used in the present invention. The coagulant is preferably added to the ink having low pigment density, and the ink is preferably used as the second ink. This is because stable storability can be improved by reducing the pigment density to suppress the pigments from coagulating.

A chelating agent may be added in the second ink in order to improve stable storability by reducing interaction between the self-dispersible pigment in the second ink and coagulant. However, it is preferable to select a compound that renders a chelate compound between the coagulant and chelating agent readily soluble in water as the chelating agent used in the present invention.

Examples of the chelating agent available in the present invention include ethylenediamine, ethylenediamine tetraacetic-acid, 1,2-propylenediamine tetraacetic acid, 1-phenylethylenediamine tetraacetic acid, 3,3-dimethylbutane-1,2-diamine tetraacetic acid, 1,2,3-triminopropane hexaacetic acid, trimethylenediamine tetraacetic acid, nitrilotriacetic acid, 1,2-cyclohexanediamine tetraacetic acid, diethylenetriamine pentaacetic acid, glycol ethylenediamine tetraacetic acid, triethylenetetramine hexaacetic acid, triethylenetetramine, tetraethylene pentamine, propane-1,2-diamine, butane-1,2-diamine, 3,3-dimethylbutane-1,2-diamine, 1,2,3-triaminopropane, trimethylenediamine, tetralin-2,3-diamine tetraacetic acid, decalin-2,3-tetraacetic acid, cyclohexane-1,2-diamine tetraacetic acid, cyclohexane-1,3-diamine tetraacetic acid, cyclohexane-1,4-diamine tetraacetic acid, oxalic acid, tiron and acetylacetone. However, the chelating agent is not restricted thereto.

The solubility of the chelate compound formed between the coagulant and chelating agent in water at 23° C. is preferably not less than 0.1 g/L, although the solubility is not particularly restricted.

As a judgment of specific degree of coagulation, the number of the particles having a diameter of not less than 5 μm in the mixed solution of the first and second inks is preferably not less than 1,000 particles/μL, more preferably not less than 2,500 particles/μL, and further preferably not less than 5,000 particles/μL. Optical density may be decreased when the number of the particles having a diameter of not less than 5 μm in the mixture of the first and second inks is less than 1,000 particles/μL.

The first and the second inks of the present invention are mixed in a mass ratio of 1:1, 2 μL of the mixed solution is sampled with stirring, and the number of the particles with a diameter of not less than 5 μm in the mixed solution is measured with Accusizer™770 Optical Particle Sizer (trade name, manufactured by Particle Sizing Systems Co.). The density of the pigment is used as the density of the dispersed particles as a parameter of measurement. The density of the pigment can be determined by measuring the density of a pigment powder obtained by drying with heating using a hydrometer or a pycnometer.

The thermal ink-jet recording method or piezo ink-jet recording method is preferably employed from the view point of improving feathering and intercolor bleeding. The reason thereof has not been made clear yet. However, it is conjectured that feathering and intercolor bleeding are improved, because the viscosity of the ink at the time of ejection of the ink is reduced by heating, but the viscosity of the ink rapidly increases on the recording medium since the ink is cooled on the recording medium. When the piezoelectric method is employed, on the other hand, a high viscosity liquid can be ejected, and the high viscosity liquid is suppressed from spreading in the radial direction on the surface of the recording medium. Consequently, this method is conjectured to be effective for improving feathering and intercolor bleeding.

The ink set for ink-jet recording and the recording apparatus capable of employing the recording method as described above are preferably used in the present invention.

Favorable embodiments of the image forming apparatus of the present invention will be described hereinafter with reference to the drawings. The same members in the drawing are given the same reference numerals; and repeated descriptions thereof are avoided.

Figure 1:
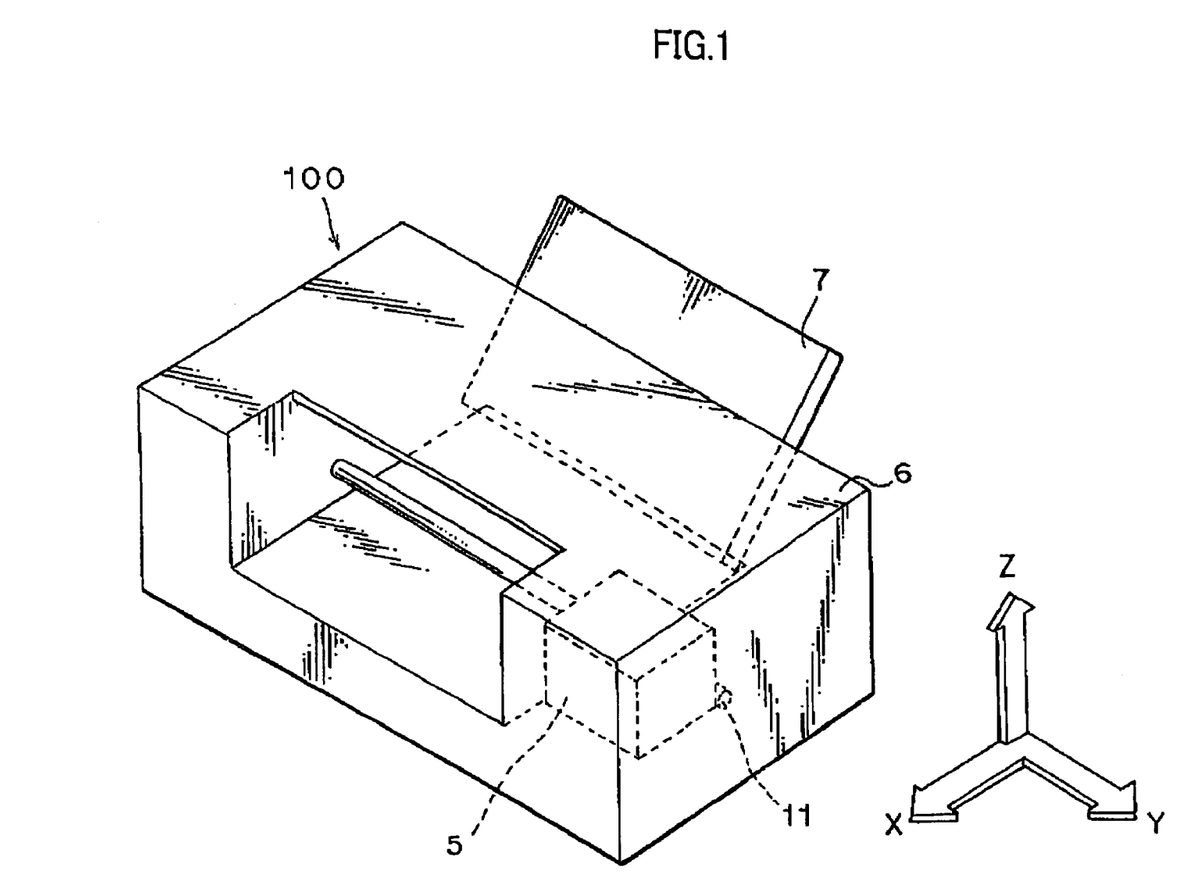
FIG. 1 is a perspective view showing an external construction of an embodiment suitable for the image forming apparatus of the present invention.
Figure 2:
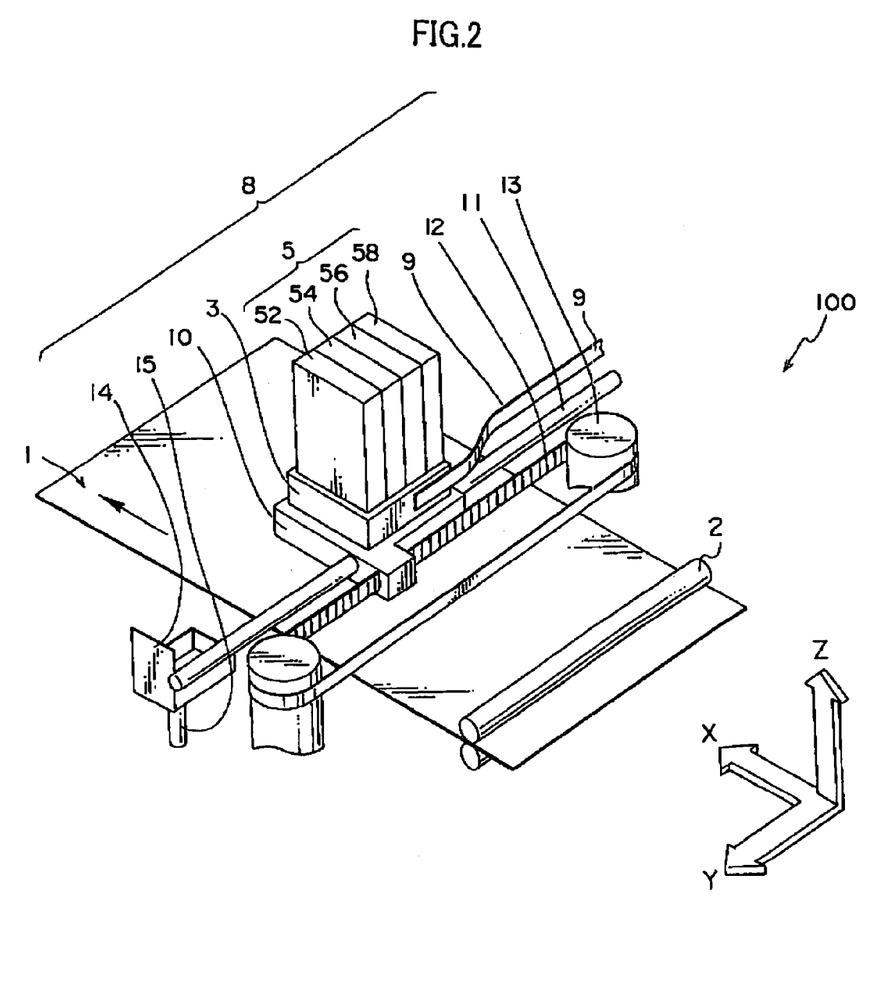
FIG. 2 is a perspective view showing a basic internal construction of the image forming apparatus in FIG. 1.

FIG. 1 is a perspective view showing an external construction of an embodiment suitable for the image forming apparatus of the present invention. FIG. 2 is a perspective view showing a basic internal construction of the image forming apparatus in FIG. 1. The image forming apparatus 100 of the present invention is constructed so that an image is formed by operating the apparatus based on the image forming method (ink-jet recording method) of the present invention. As shown in FIGS. 1 and 2, the image forming apparatus 100 mainly comprises a casing 6, a tray 7 capable of mounting a given sheets of recording media 1 such as regular paper sheets, a conveyer roller (trasfer means) 2 for transferring the recording media 1 one after another into the image forming apparatus 100, and an image forming member (image forming means) 8 for forming an image by ejecting the ink and liquid composition on the sauce of the recording medium 1.

The conveyer roller 2 comprises a pair of rollers rotatably disposed within the image forming apparatus 100. The rollers hold the recording medium piled in the tray 7 between the rollers, and predetermined number of the recording media 1 is transferred one after another into the apparatus 100 at a given timing.

The image forming member 8 forms an image of the ink on the surface of the recording medium 1. The image forming member 8 mainly comprises a recording head 3, an ink tank set 5, a signal power supply cable 9, a carriage 10, a guide rod 11, a timing belt 12, a driving pulley 13, and a maintenance unit 14.

The ink tank set 5 comprises ink tanks 32, 54, 56 and 58 in which inks having respectively different colors ink and liquid compositions are ejectably filled.

The first inks and second inks of the present invention are filled in these ink tanks.

As shown in FIG. 2, the signal power supply cable 9 and ink tank set 5 are connected to the recording head 3. When external image recording information is given to the recording head 3 thorough the signal power supply cable 9, a given volume of the ink is sucked from each ink tank to eject the ink on the surface of the recording medium. The signal power supply cable 9 is responsible for supplying an electric power required for driving the recording head 3 to the recording head 3 while supplying image recording information.

The recording head 3 is disposed and held on the carriage 10, which is connected to the guide rod 11 and timing belt 12 connected to the driving pulley 13. Such construction permits the recording head 3 to move in a direction parallel to the surface of the recording medium 1 and in a direction Y (main scanning direction) perpendicular to the convey direction X (sub-scanning direction) of the recording medium 1 such that the head is along the lines with the guide rod 11.

The image forming apparatus 100 also comprises a control mean (not shown) for adjusting the drive drag between the recording head 3 and the carriage 10 based on image recording information. This control mean permits images to be continuously formed in a prescribed area on the surface of the recording medium 1 conveyed at a given speed in the convey direction X based on image recording information.

EXAMPLES

Examples of the present invention will be described in detail hereinafter.

<Pigment Treatment Method>

An aqueous sulfanilic acid solution is warmed and 100 g of a pigment is added thereto under stirring. This mixed solution is cooled to room temperature with sting, and 14 g of conc. nitric acid is dribbled into the solution. 10 g of an aqueous $NaNO_2$ solution is added into the solution, and the obtained solution is stirred continuously until the reaction is completed. This solution which is contained pigment is desalted, and a surface-treated pigment is obtained. Ion-exchange water is added to make concentration of the surface-treated pigment being 12% by mass, and then the pigment solution is dispersed with a ultrasonic homogenizer. The dispersed solution is adjusted the pH to 7.5. This dispersion solution is centrifuged (for 30 minutes at 8,000 rpm) with a centrifuge to remove residues (20% by mass of the total quantity).

<Preparation of Inks>

An appropriate quantity each of colorant solution, water soluble organic solvent, surfactant and ion-exchange water are added to form a predetermined composition, and the solution is mixed with stirring. The obtained liquid is filtered through a 5 μm filter and a desired ink is obtained.

(Ink A)

| | |
|---|---|
| Carbojet-300 (self-dispersible pigment having carboxylate groups, manufactured by Cabot Corporation) | 4% by mass |
| Styrene-acrylic acid-sodium acrylate copolymer | 0.3% by mass |
| Diethylene glycol | 10% by mass |
| Glycerin | 5% by mass |
| 2-pyrrolidone | 5% by mass |
| Urea | 4% by mass |
| Acetyleneglycol-ethylene oxide adduct | 0.2% by mass |
| Ion-exchange water | balance |

This ink had a ζ-potential of −16 mV, a volume average particle diameter of 96 nm, a viscosity of 2.5 mPa·s and a surface tension of 32 mN/m.

(Ink B)

| | |
|---|---|
| IJX 253 (self-dispersible pigment having carboxylate groups, manufactured by Cabot Corporation) | 4% by mass |
| Giethyleneglycol | 20% by mass |
| Sulfolane | 5% by mass |
| Urea | 5% by mass |
| Acetyleneglycol-ethylene oxide adduct | 1% by mass |
| Magnesium nitrate | 0.1% by mass |
| Ethylenediamine tetraacetic acid | 0.03% by mass |
| Ion-exchange water | balance |

This ink had a ζ-potential of −21 mV, a volume average particle diameter of 132 nm, a viscosity of 2.5 mPa·s and a surface tension of 30 mN/m.

(Ink C)

| | |
|---|---|
| C.I. Pigment blue 15:2 (self-dispersible pigment having sulfonic acid groups) | 3% by mass |
| Diethyleneglycol | 15% by mass |
| Triethyleneglycol monobutyl ether | 5% by mass |
| Urea | 3% by mass |
| Acetyleneglycol-ethylene oxide adduct | 0.9% by mass |
| Calcium chloride | 0.075% by mass |
| Ion-exchange water | balance |

This ink had a ζ-potential of −23 mV, a volume average particle diameter of 124 nm, a viscosity of 2.4 mPa·s and a surface tension of 31 mN/m.

(Ink D)

The pigment treated by the pigment treatment method is formed into an ink by a predetermined method.

| | |
|---|---|
| C.I. Pigment red 122 (self-dispersible pigment having sulfonic add groups) | 4% by mass |
| Diethyleneglycol | 10% by mass |
| Diethyleneglycol monobutyl ether | 5% by mass |
| Glycerin | 5% by mass |
| Urea | 3% by mass |
| Acetyleneglycol-ethylene oxide adduct | 1.2% by mass |
| Calcium nitrate | 0.1% by mass |
| Ion-exchange water | balance |

This ink had a ζ-potential of −13 mV, a volume average particle diameter of 118 n, a viscosity of 2.6 mPa·s and a surface tension of 31 mN/m.

(Ink E)

The pigment treated by the pigment treatment method is formed into an ink by a predetermined method.

| | |
|---|---|
| C.I. Pigment yellow 74 (self-dispersible pigment having sulfonic acid groups) | 4% by mass |
| Diethyleneglycol | 15% by mass |
| N-methyl-2-pyrrolidone | 5% by mass |
| Urea | 6% by mass |
| Acetyleneglycol-ethylene oxide adduct | 1% by mass |
| Calcium nitrate | 0.1% by mass |
| Glycol ethylenediamine tetraacetic acid | 0.05% by mass |
| Ion-exchange water | balance |

This ink had a ζ-potential of −12 mV, a volume average particle diameter of 125 nm, a viscosity of 2.5 mPa·s and a surface tension of 33 mN/m.

(Ink F)

The pigment treated by the pigment treatment method is formed into an ink by a predetermined method.

| | |
|---|---|
| C.I. Pigment blue 15:3 (self-dispersible pigment having sulfonic acid groups) | 3% by mass |
| Diethyleneglycol | 15% by mass |
| Triethyleneglycol monobutyl ether | 5% by mass |
| Urea | 3% by mass |
| Acetyleneglycol-ethylene oxide adduct | 1% by mass |
| Ion-exchange water | balance |

This ink had a $\zeta$-potential of −38 mV, a volume average particle diameter of 92 nm, a viscosity of 2.0 mPa·s and a surface tension of 32 mN/m.

(Ink G)

The pigment treated by the pigment treatment method is formed into an in by a predetermined method.

| | |
|---|---|
| C.I pigment blue 15:3 (self-dispersible pigment having sulfonic acid groups) | 0.75% by mass |
| Diethyleneglycol | 15% by mass |
| Triethyleneglycol monobutyl ether | 5% by mass |
| Urea | 3% by mass |
| Acetyleneglycol-ethylene oxide adduct | 1% by mass |
| Calcium chloride | 0.15% by mass |
| Ion-exchange water | balance |

This ink had a $\zeta$-potential of −27 mV, a volume average particle diameter of 125 nm, a viscosity of 1.8 mPa·s and a surface tension of 31 mN/m.

(Ink H)

The pigment treated by the pigment treatment method is formed into an ink by a predetermined method.

| | |
|---|---|
| C.I. Pigment red 122 (auto-dispersible pigment having sulfonic acid groups) | 4% by mass |
| Diethyleneglycol | 10% by mass |
| Diethyleneglycol monobutyl ether | 5% by mass |
| Glycerin | 5% by mass |
| Urea | 3% by mass |
| Acetyleneglycol-ethylene oxide adduct | 1% by mass |
| Ion-exchange water | balance |

This ink had a $\zeta$-potential of −35 mV, a volume average particle diameter of 86 nm, a viscosity of 2.4 mPa·s and a surface tension of 33 mN/m.

(Ink I)

The pigment treated by the pigment treatment method is formed into an ink by a predetermined method.

| | |
|---|---|
| C.I. Pigment red 122 (auto-dispersible pigment having sulfonic acid groups) | 1% by mass |
| Diethylene glycol | 10% by mass |
| Diethyleneglycol monobutyl ether | 5% by mass |
| Glycerin | 5% by mass |
| Urea | 3% by mass |
| Acetyleneglycol-ethylene oxide adduct | 1% by mass |
| Calcium nitrate | 0.125% by mass |
| Ion-exchange water | balance |

This ink had a $\zeta$-potential of −24 mV, a volume average particle diameter of 118 nm, a viscosity of 1.9 mPa·s and a surface tension of 32 mN/m.

(Ink J)

| | |
|---|---|
| Cabojet 200 (self-dispersible pigment having sulfonic acid groups, manufactured by Cabot Corporation) | 2% by mass |
| Diethyleneglycol | 25% by mass |
| Propyleneglycol | 10% by mass |
| Urea | 3% by mass |
| Isopropyl alcohol | 5% by mass |
| Magnesium acetate | 0.1% by mass |
| Ion-exchange water | balance |

This ink had a $\zeta$-potential of −18 mV, a volume average particle diameter of 148 nm, a viscosity of 6.2 mPa·s and a surface tension of 32 mN/m.

(Ink K)

| | |
|---|---|
| C.I. Pigment blue 15:3 (pigment having no surface functional groups) | 4% by mass |
| Styrene-acrylic acid copolymer | 0.5% by mass |
| Diethyleneglycol | 10% by mass |
| Propyleneglycol | 10% by mass |
| Urea | 5% by mass |
| Isopropyl alcohol | 3% by mass |
| Acetyleneglycol-ethylene oxide adduct | 1% by mass |
| Magnesium nitrate | 0.075% by mass |
| Water | balance |

This ink had a $\zeta$-potential of −7 mV, a volume average particle diameter of 354 nm, a viscosity of 2.9 mPa·s and a surface tension of 34 mN/m.

(Ink L)

| | |
|---|---|
| Mogul L (pigment having no surface functional groups, manufactured by Cabot Corporation) | 4% by mass |
| Styrene-acrylic acid copolymer | 0.5% by mass |
| Diethyleneglycol | 15% by mass |
| Diglycerin-ethylene oxide adduct | 5% by mass |
| Urea | 5% by mass |
| Isopropyl alcohol | 3% by mass |
| Ion-exchange water | balance |

This ink had a $\zeta$-potential of −33 mV, a volume average particle diameter of 85 nm, a viscosity of 2.5 mPa·s and a surface tension of 52 mN/m.

(Ink M)

| | |
|---|---|
| Cabojet-300 (with surface functional groups of carboxylic acid, manufactured by Cabot Corporation) | 4.5% by mass |
| Diethyleneglycol | 10% by mass |
| Glycerin | 5% by mass |
| 2-pyrrolidone | 5% by mass |
| Urea | 4.5% by mass |
| Acetyleneglycol-ethylene oxide adduct | 0.7% by mass |
| Potassium oxalate | 0.25% by mass |
| Ion-exchange water | balance |

This ink had a $\zeta$-potential of −12 mV, a volume average particle diameter of 122 nm, a viscosity of 2.3 mPa·s and a surface tension of 32 mN/m.

<Evaluation Methods>

The second ink is printed on a FX-P paper sheet (manufactured by Fuji Xerox Co., Ltd.) using a test print head with a nozzle number of 256 and resolution of 800 dpi, and then the first ink is printed on the printed image with the second ink. When a plurality of second inks are used, the first ink is printed after printing the second inks in an arbitrary order. The image is printed in a normal environment (at a temperature of 23±0.5° C. and a humidity of 55±5% R.H), and the proportion of the quantities of each applied ink is changed as shown in Table 1.

The printed images are left in the normal environment for 24 hours after printing, and are evaluated as follows.

(Optical Density)

The optical density of the printed image is measured with X-Rite 404 (trade name, manufactured by X-Rite Incorporated.). The permissible level is evaluated as levels A or B.

Evaluation Criteria (Black Ink)
A: Optical density of not less than 1.4.
B: Optical density of not less than 1.3 and less than 1.4.
C: Optical density of less than 1.3.

Evaluation Criteria (Color Ink)
A: Optical density of not less than 1.1.
B: Optical density of not less than 1.0 and less than 1.1.
C: Optical density of less than 1.0.

(Intercolor Bleeding)

Adjoining patterns having different colors to one another are printed, and intercolor bleeding is visually evaluated by comparing the extent of feathering at the boundary between the two different color patterns with a limiting sample.

Evaluation Criteria
A: Little feathering.
B: Feathering of the permissible level.
C: Sever feathering out of the range of the permissible level.

(Feathering)

Monochromatic fine line patterns are printed, and feathering of the printed patterns is visually evaluated by comparing the extent of feathering with a limiting sample.

Evaluation Criteria
A: Little feathering.
B: Feathering of the permissible level.
C: Sever feathering out of the range of the permissible.

(Drying Time)

A 100% coverage pattern is printed on a FX-P paper sheet After the printed sheet is kept for prescribed time, another PX-P paper sheet is pressed onto the printed sheet with a load of $1.9 \times 10^4$ N/m$^2$. A drying time is defined as a time when further transfer of the ink to the pressed FX-P paper sheet did not take place. The permissible level is evaluated as levels A or B.

Evaluation Criteria
A: A drying time of less than 3 seconds.
B: A drying time of not less than 3 seconds and less than 10 seconds.
C: A drying time of not less than 10 seconds.

(Long Term Reliability)

The long-term reliability is judged based on the changes of the ink ejection speed over time. The ink ejection speed is measured at an initial state. Then, the ink ejection speed is measured again after printing with $1 \times 10^8$ pulses of section. The proportion of the ink ejection speed at the initial state to the ink ejection speed after $1 \times 10^8$ pulses of ejection is calculated, and the long-term reliability is evaluated according to the following criteria The permissible level is evaluated as levels A or B.

Evaluation Criteria
A: The ejection speed after $1 \times 10^8$ pulses of ejection is not less than 90% of the initial ejection speed.
B: The ejection speed after $1 \times 10^8$ pulses of ejection is not less than 75% and less than 90% of the initial ejection speed.
C: The ejection speed after $1 \times 10^8$ pulses of ejection is less than 75% of the initial ejection speed.

(Counting of the Number of Particles)

The first and second inks are mixed in a mass ratio of 1:1, and 2 μL each of the mixed solution is sampled. The number of the particles with a particle diameter of not less than 5 μm in the mixed ink solution is counted using Accusizer™770 Optical particle Sizer (trade name, manufactured by Particle Sizing Systems Co.). The density of the pigment is used as the density of the dispersed particles required as a parameter for the measurement. The density of the pigment is obtained by measuring the dry pigment powder obtained by drying the pigment using a hydrometer or pycnometer.

The samples prepared are listed in Tables 1 and 2, and the results of measurement are shown in Table 3.

TABLE 1

| | Ink | Surface functional group | Coagulant | ζ-potential (mV) | Surface tension (mN/m) | Volume average Particle diameter (nm) | Surface tension (mN/m) | Viscosity (mPa·s) | ζ-potential of pigment (mV) | Ratio between applied inks | Number of particles with diameter of not less than 5μ (particles/μL) |
|---|---|---|---|---|---|---|---|---|---|---|---|
| Example 1 | A | Carboxylic acid | without | −16 | 32 | 96 | 32 | 2.5 | −23 | 0.25 | 1,200 |
| | B | Sulfonic acid | with | −21 | 30 | 132 | 30 | 2.5 | −52 | | |
| Example 2 | A | Carboxylic acid | without | −16 | 32 | 96 | 32 | 2.5 | −23 | 0.30 | 2,100 |
| | C | Sulfonic acid | with | −23 | 31 | 124 | 31 | 2.4 | −48 | | |
| Example 3 | A | Carboxylic acid | without | −16 | 32 | 96 | 32 | 2.5 | −23 | 0.30 | 1,400 |
| | D | Sulfonic acid | with | −13 | 31 | 118 | 31 | 2.6 | −37 | | |
| Example 4 | L | Dispersant | without | −33 | 52 | 85 | 52 | 2.5 | −33 | 0.50 | 3,000 |
| | M | Carboxylic acid | with | −12 | 32 | 122 | 32 | 2.3 | −23 | | |
| Comparative Example 1 | A | Carboxylic acid | without | −16 | 32 | 96 | 32 | 2.5 | −23 | 0.05 | 20 |
| | F | Sulfonic acid | without | −38 | 32 | 92 | 32 | 2 | −46 | | |

TABLE 1-continued

| | Ink | Surface functional group | Coagulant | ζ-potential (mV) | Surface tension (mN/m) | Volume average Particle diameter (nm) | Surface tension (mN/m) | Viscosity (mPa·s) | ζ-potential of pigment (mV) | Ratio between applied inks | Number of particles with diameter of not less than 5μ (particles/μL) |
|---|---|---|---|---|---|---|---|---|---|---|---|
| Comparative Example 2 | A | Carboxylic acid | without | −16 | 32 | 96 | 32 | 2.5 | −23 | 0.50 | 3,000 |
| | K | Dispersant | with | −7 | 34 | 354 | 34 | 2.3 | −30 | | |

TABLE 2

| | Ink | Surface functional group | Coagulant | ζ-potential (mV) | Surface tension (mN/m) | Volume average particle diameter (nm) | Surface tension (mN/m) | Viscosity (mPa·s) | ζ-potential of pigment (mV) |
|---|---|---|---|---|---|---|---|---|---|
| Example 5 | A | Carboxylic acid | without | −16 | 32 | 96 | 32 | 2.5 | −23 |
| | C | Sulfonic acid | with | −23 | 31 | 124 | 31 | 2.4 | −48 |
| | D | Sulfonic acid | with | −13 | 31 | 118 | 31 | 2.6 | −37 |
| | E | Sulfonic acid | with | −12 | 33 | 125 | 33 | 2.5 | −26 |
| Example 6 | A | Carboxylic acid | without | −16 | 32 | 96 | 32 | 2.5 | −23 |
| | F | Sulfonic acid | without | −38 | 32 | 92 | 32 | 2.0 | −48 |
| | G | Sulfonic acid | with | −27 | 31 | 125 | 31 | 1.8 | −48 |
| | H | Sulfonic acid | without | −35 | 33 | 86 | 33 | 2.4 | −37 |
| | I | Sulfonic acid | with | −24 | 32 | 118 | 32 | 1.9 | −37 |
| | E | Sulfonic acid | with | −12 | 33 | 125 | 33 | 2.5 | −26 |
| Example 7 | A | Carboxylic acid | without | −16 | 32 | 96 | 32 | 2.5 | −23 |
| | J | Sulfonic acid | with | −18 | 32 | 148 | 32 | 6.2 | −35 |
| | F | Sulfonic acid | without | −38 | 32 | 92 | 32 | 2.0 | −48 |

TABLE 3

| | Ink | Surface functional group | Coagulant | Optical density | Feathering | Intercolor bleeding | Drying time | Long term reliability |
|---|---|---|---|---|---|---|---|---|
| Example 1 | A | Carboxylic acid | without | A | A | A | A | A |
| | B | Sulfonic acid | with | | | | | |
| Example 2 | A | Carboxylic acid | without | A | A | A | A | A |
| | C | Sulfonic acid | with | | | | | |
| Example 3 | A | Carboxylic acid | without | A | A | A | A | A |
| | D | Sulfonic acid | with | | | | | |
| Example 4 | L | Dispersant | without | A | A | A | A | A |
| | M | Carboxylic acid | with | | | | | |
| Example 5 | A | Carboxylic acid | without | A | A | A | A | A |
| | C | Sulfonic acid | with | | | | | |
| | D | Sulfonic acid | with | | | | | |
| | E | Sulfonic acid | with | | | | | |
| Example 6 | A | Carboxylic acid | without | A | A | A | A | A |
| | F | Sulfonic acid | without | | | | | |
| | G | Sulfonic acid | with | | | | | |
| | H | Sulfonic acid | without | | | | | |
| | I | Sulfonic acid | with | | | | | |
| | E | Sulfonic acid | with | | | | | |
| Example 7 | A | Carboxylic acid | without | A | A | A | A | A |
| | J | Sulfonic acid | with | | | | | |
| | F | Sulfonic acid | without | | | | | |
| Comparative example 1 | A | Carboxylic acid | without | C | C | C | A | A |
| | F | Sulfonic acid | without | | | | | |

TABLE 3-continued

| | Ink | Surface functional group | Coagulant | Optical density | Feathering | Intercolor bleeding | Drying time | Long term reliability |
|---|---|---|---|---|---|---|---|---|
| Comparative example 2 | A | Carboxylic acid | without | A | A | C | A | C |
| | K | Dispersant | with | | | | | |

Table 3 shows that the ink set is excellent in long-term reliability when the absolute value of the ζ-potential of the second ink is not less than 10 mV even when the second ink contains the pigment and coagulant. The stability is particularly excellent when functional group on the surface of the pigment in the second ink is sulfonic acid. An ink set, which is excellent in optical density, feathering, intercolor bleeding and drying time, is obtained by preparing the first and the second inks so that the ink composition according to the present invention is obtained.

The present invention as hitherto described provides an ink set for ink-jet recording which is excellent in optical density, feathering, intercolor bleeding, drying time and long-term reliability, and an ink jet recording method and ink-jet recording apparatus using the ink set.

What is claimed is:

1. An ink set for ink-jet recording using at least two kinds of inks, wherein:
   the ink set comprises a first ink containing at least a pigment, a water-soluble solvent and water, and a second ink containing at least a pigment, a coagulant, a water-soluble solvent and water; and
   an absolute value of ζ-potential of the second ink is not less than 10 mV; and
   a number of particles having a diameter of not less than 5 μm in a mixed solution of equal amounts by mass of the first and second inks is not less than 1,000 particles/ μL.

2. An ink set for ink-jet recording according to claim 1, wherein:
   the pigment in the second ink is at least one selected from the group consisting of a self-dispersible pigment having at least sulfonic acid or a sulfonate salt as functional groups on a surface of the pigment, and a pigment dispersed using a dispersant having sulfonate groups; and
   the coagulant is an electrolyte.

3. An ink set for ink-jet recording according to claim 2, wherein the coagulant is a polyvalent metal salt.

4. An ink set for ink-jet recording according to claim 1, wherein:
   the pigment in the second ink is at least one selected from the group consisting of a self-dispersible pigment having at least carboxylic acid or a carbonate salt on a surface pf the pigment as functional groups, and a pigment dispersed using a dispersant having carboxylate groups; and
   the coagulant is a monovalent electrolyte.

5. An ink set for ink-i et recording according to claim 1, wherein:
   the pigment in the second ink has functional groups on a surface of the pigment; and
   an amount of the functional groups on the surface of the pigment in the second ink is not less than 0.3 mmol/g based on an amount of the pigment in the second ink.

6. An ink set for ink-jet recording according to claim 1, wherein:
   each pigment in the first and second inks is at least one selected from the group consisting of a pigment dispersed with a polymer dispersant, a self-dispersible pigment, and a pigment coated with a resin; and
   the pigment in the first ink is carbon black and the pigment in the second ink is an organic pigment, or the pigment in the first ink is an organic pigment and the pigment in the second ink is carbon black.

7. An ink set for ink-jet recording according to claim 6, wherein a surface tension of the ink containing the carbon black is not less than 20 mN/m and not larger than 60 mN/m, and/or a surface tension of the ink containing the organic pigment is not less than 20 mN/m and not larger than 45 mN/m.

8. An ink set for ink-jet recording according to claim 1, wherein the first ink further contains a resin having a carboxylic acid or a carboxylate salt.

9. An ink set for ink-jet recording according to claim 1, wherein a volume average particle diameter of a pigment in each of the first and second inks is not less than 30 nm and not larger than 250 nm.

10. An ink set for ink-jet recording according to claim 1, wherein a viscosity of each of the first and second inks is not less than 1.2 mPa·s and not larger than 8.0 mPa·s.

11. An ink set for ink-jet recording according to claim 1, wherein an absolute value of ζ-potential of the first ink is not less than 5 mV, and/or an absolute value of ζ-potential of the pigment in the second ink is not less than 30 mV in an aqueous dispersion solution.

12. An ink set for ink-jet recording according to claim 1, wherein:
   a first ink containing at least one selected from the group consisting of a pigment dispersed in a polymer dispersant, a self-dispersible pigment and a resin-coated pigment and further containing a water-soluble solvent, water and a resin containing carboxylic acid or a carboxylate salt; and
   a second ink containing a pigment having sulfonic acid or a salt thereof as a surface functional group, a polyvalent mineral salt, a water-soluble solvent and water, wherein
   the first ink has
   (i) a surface tension of not less than 20 mN/m and not larger than 60 mN/m,
   (ii) an absolute value of ζ-potential of not less than 5 mV,
   (iii) a viscosity of not less than 1.2 mPa·s and not larger than 8.0 mPa·s, and
   (iv) a volume average particle diameter of not less than 30 nm and not larger than 250 nm; and
   the second ink has
   (v) a surface tension of not less than 20 mN/m and not larger than 45 mN/m,
   (vi) an absolute value of ζ-potential of not less than 10 mV, (vi) a ζ-potential of the pigment of the ink of not less than 30 mV, (viii) a viscosity of not less than 1.2 mPa·s and not larger than 8.0 mPa·s, and (ix) a volume average particle diameter of not less than 30 nm and not larger than 250 nm.

13. An ink-jet recording method using a first ink containing at least a pigment, a water-soluble solvent and water, and a second ink containing at least a pigment, a coagulant, a water-soluble solvent and water and having an absolute value of ζ-potential of not less than 10 mV, wherein an image is formed by applying the first ink and second ink on a recording medium so as to contact each other, and wherein a number of particles having a diameter of not less than 5 μm in a mixed solution of equal amounts by mass of the first and second inks is not less than 1,000 particles/μL.

14. An ink-jet recording method according to claim 13, wherein:

the pigment in the second ink is at least one selected from the group consisting of a self-dispersible pigment having at least sulfonic acid or a sulfonate salt as functional groups on a surface of the pigment, and a pigment dispersed using a dispersant having sulfonate groups; and the coagulant is a polyvalent metal salt.

15. An ink-jet recording method according to claim 13, wherein:

the pigment in the second ink is at least one selected from the group consisting of a self-dispersible pigment having at least carboxylic acid or a carboxylate salt on a surface of the pigment as functional groups, and a pigment dispersed using a dispersant having carboxylate groups; and the coagulant is a monovalent electrolyte.

16. An ink-jet recording method according to claim 13, wherein:

the first ink and second ink are applied on a recording medium in a quantity of not larger than 25 ng per 1 drop; and the proportion of a quantity of the first ink applied for forming one pixel on the recording medium relative to an applied quantity of the second ink is not less than 0.1 and not larger than 10.

17. An ink-jet recording apparatus comprising a recording head for ejecting each ink in an ink set for ink-jet recording, the ink set for ink-jet recording comprising at least two kinds of inks, wherein:

a first ink contains at least a pigment, a water-soluble solvent and water, and a second ink contains at least a pigment, a coagulant, a water-soluble solvent and water; and the second ink has an absolute value of ζ-potential of not less than 10 mV; and a number of particles having a diameter of not less than 5 μm in a mixed solution of equal amounts by mass of the first and second inks is not less than 1,000 particles/μL.

18. An ink-jet recording apparatus according to claim 17, wherein an image is formed by applying the first ink and second ink on a recording medium so as to contact each other.

19. An ink-jet recording apparatus according to claim 17, wherein:

the first ink and second ink are applied on a recording medium in a quantity of not larger than 25 ng per 1 drop; and the proportion of a quantity of the first ink applied for forming one pixel on the recording medium relative to an applied quantity of the second ink is not less than 0.1 and not larger than 10.

20. An ink set for ink-jet recording according to claim 1, wherein an absolute value of ζ-potential of the second ink is not less than 10 mV and not larger than 60 mV.

21. An ink set for ink-jet recording according to claim 1, wherein an absolute value of ζ-potential of the second ink is not less than 30 mV in an aqueous dispersion solution.

* * * * *